US008144138B2

(12) United States Patent
Kim et al.

(10) Patent No.: US 8,144,138 B2
(45) Date of Patent: Mar. 27, 2012

(54) LIQUID CRYSTAL DISPLAY DEVICE

(75) Inventors: Sung Hoon Kim, Gyeonggi-do (KR); Moo Jin Lee, Gyeongbuk (KR); Ki Jeong Lee, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 310 days.

(21) Appl. No.: 12/619,976

(22) Filed: Nov. 17, 2009

(65) Prior Publication Data

US 2010/0123692 A1 May 20, 2010

(30) Foreign Application Priority Data

Nov. 19, 2008 (KR) ........................ 10-2008-0115133

(51) Int. Cl.
*G06F 3/038* (2006.01)

(52) U.S. Cl. ........................................................ 345/204

(58) Field of Classification Search ........................ None
See application file for complete search history.

(56) References Cited

U.S. PATENT DOCUMENTS

2008/0001874 A1 1/2008 Seo et al.
2008/0143911 A1* 6/2008 Jin et al. .......................... 349/48
2008/0143930 A1* 6/2008 Jin et al. .......................... 349/96
2008/0259264 A1* 10/2008 Jin ................................ 349/146
2008/0316398 A1* 12/2008 Woo et al. ..................... 349/110
2009/0303420 A1* 12/2009 Kim et al. ...................... 349/96

FOREIGN PATENT DOCUMENTS

CN 101097699 1/2008

OTHER PUBLICATIONS

Chinese Office Action for corresponding Patent Application 200910246809.1 dated Aug. 31, 2011.

* cited by examiner

*Primary Examiner* — Paul Huber
(74) *Attorney, Agent, or Firm* — Morgan, Lewis & Bockius LLP

(57) ABSTRACT

A liquid crystal display device capable of controlling a viewing angle is disclosed.
The liquid crystal display device includes: a liquid crystal panel configured to include a plurality of quad type pixels each consisted of red, green, blue, and viewing angle control sub-pixels; and a timing controller configured to reply to a viewing angle mode selected by a user and apply red, green, and blue data and any one of a wide viewing angle control data, a first narrow viewing angle control data, and a second narrow viewing angle control data to the liquid crystal panel. As such, the LCD device controls a range of viewing angles, thereby allowing the image to be viewed from every direction or not to be viewed from the left and right directions or the upward diagonal directions in the center of the user. In other words, the LCD device can limit the image display according to the positions of the persons adjacent to the user. Therefore, the user using the LCD device can adjust it to freely share information or to limit its range with adjacent persons. Furthermore, the LCD device can enhance information reliability and security.

11 Claims, 6 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2008-0115133, filed on Nov. 19, 2008, which is hereby incorporated by reference in its entirety.

BACKGROUND

1. Field of the Disclosure

This disclosure relates to a liquid crystal display device, and more particularly to a liquid crystal display device adapted to control a viewing angle.

2. Description of the Related Art

As the information society grows, flat display devices capable of displaying information have become widely developed. These flat display devices include liquid crystal display (LCD) devices, organic electro-luminescence display (OLED) devices, plasma display devices, and field emission display devices.

Among the above display devices, LCD devices have the advantage in that they are light, small, and can provide a low power drive and a full color scheme. Accordingly, LCD devices have become widely used for mobile phones, navigation systems, portable computers, televisions and so on. The LCD device controls the transmittance of a liquid crystal on a liquid crystal panel, thereby displaying a desired image.

The LCD devices include a TN (Twisted Nematic) mode LCD device and an IPS (In Plane Switching) mode LCD device. The TN mode LCD device displays an image using a vertical electric field, while the IPS mode LCD device displays an image using a horizontal electric field.

More specifically, the TN mode LCD device enables a liquid crystal to be driven by a vertical electric field between pixel electrodes arranged on a lower substrate and a common electrode disposed on an upper substrate, in order to display images. However, there is a disadvantage in that the TN mode LCD device is limited to a relatively narrow viewing angle.

On the other hand, the IPS mode LCD device forces a liquid crystal to be driven by a horizontal electric field between pixel electrodes and common electrodes arranged parallel to each other on a lower substrate, thereby displaying images. The IPS mode LCD device provides a relatively wide viewing angle in comparison with that of the TN mode LCD device. In other words, the IPS mode LCD device has the advantage of a wider viewing angle. As such, the IPS mode LCD device is widely used.

Images displayed on the LCD device are generally viewable to other persons. However, for recently reinforced information security, it is keenly necessary for screens not to be viewable to other adjacent persons.

In order to meet this requirement, an LCD device adapted to control a viewing angle whether wide or narrow is proposed. The LCD device can prevent a displayed image from being viewed by adjacent persons whose eyes are positioned on the same line as those of a user. However, there is a disadvantage in that the image displayed on the LCD device is viewed by adjacent persons whose eyes are at higher positions than those of a user. In other words, the image on the LCD device is visible to persons adjacent to the user from upwardly diagonal directions.

BRIEF SUMMARY

Accordingly, the present embodiments are directed to an LCD device that substantially obviates one or more of problems due to the limitations and disadvantages of the related art.

An object of the present embodiment is to provide an LCD device that is adapted to selectively prevent images from being viewed by persons who are adjacent to a user from horizontal or upward diagonal directions.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a liquid crystal panel configured to include a plurality of quad type pixels each consisted of red, green, blue, and viewing angle control sub-pixels; and a timing controller configured to reply to a viewing angle mode selected by a user and apply red, green, and blue data and any one of a wide viewing angle control data, a first narrow viewing angle control data, and a second narrow viewing angle control data to the liquid crystal panel.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
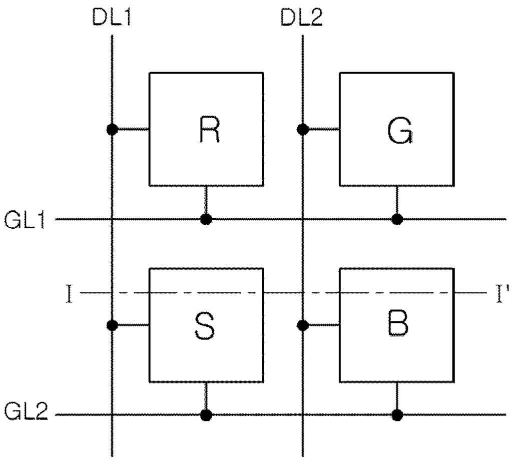
FIG. 1 is a planer view showing the configuration of a pixel on a liquid crystal panel according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
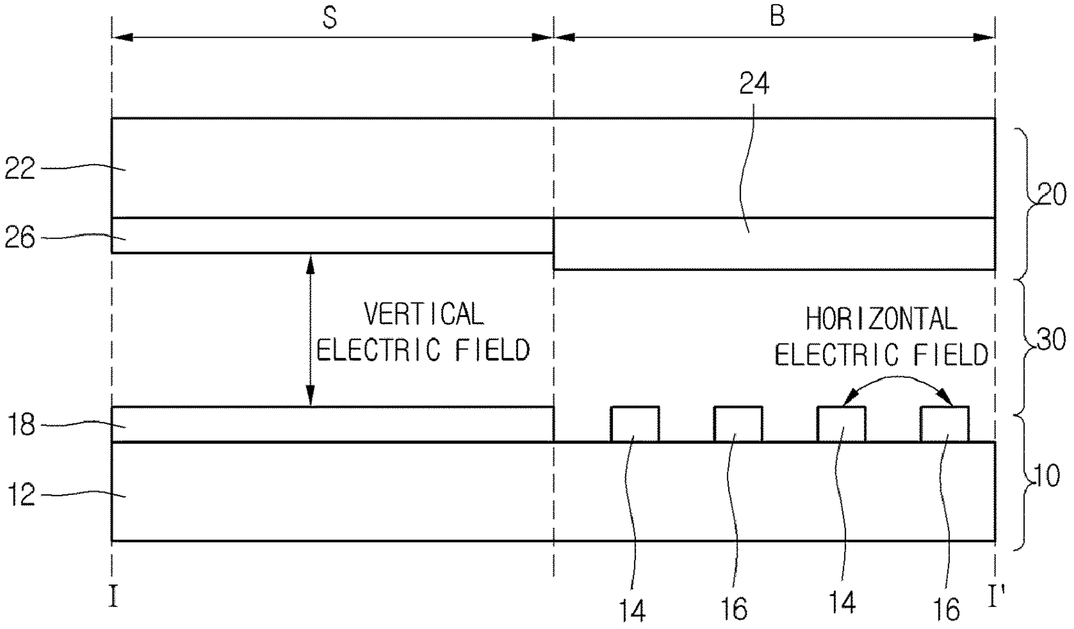
FIG. 2 is a cross-sectional view showing the pixel structure of the liquid crystal panel taken along the line I-I' shown in FIG. 1.

FIG. 1 is a planer view showing the configuration of a pixel on a liquid crystal panel according to an embodiment of the present disclosure. Also, FIG. 2 is a cross-sectional view showing the pixel structure of the liquid crystal panel taken along the line I-I' shown in FIG. 1.

Referring to FIG. 1, a pixel on a liquid crystal panel according to an embodiment of the present disclosure is of a quad type. The pixel includes red, green, and blue sub-pixels R, G, and B used in displaying an image, and a viewing angle control sub-pixel S used in controlling a view angle. These red, green, blue, and viewing angle control sub-pixels R, G, B, and S can be adjacently arranged to one another.

For an example, the red and green sub-pixels R and G can be commonly connected to a first gate line GL1, and the blue and viewing angle control sub-pixels B and S can be commonly connected to a second gate line GL2. Also, the red and viewing angle control sub-pixels R and S can be commonly connected to a first data line DL1, and the green and blue sub-pixels G and B can be commonly connected a second data line DL2.

In other words, the red sub-pixel R can be defined by the first gate and data lines GL1 and DL1. The green sub-pixel G can be defined by the first gate line GL1 and the second data line DL2. The viewing angle control sub-pixel S can be defined by the second gate line GL2 and the first data line DL1. The blue sub-pixel B can be defined by the second gate and data lines GL2 and DL2. The arrangement of sub-pixels R, G, B, and S may be freely modified.

Such red, green, and blue sub-pixels R, G, and B can drive a liquid crystal by respective horizontal electric fields. The viewing angle control sub-pixel S can drive a liquid crystal using a vertical electric field.

Referring to FIG. 2, the liquid crystal panel according to an embodiment of the present disclosure includes a lower substrate 10, an upper substrate 20, and a liquid crystal layer 30 interposed between the substrates 10 and 20.

The lower substrate 10 can include gate lines (not shown), data lines (not shown), thin film transistors, first and second pixel electrodes 14 and 18, and first common electrodes 16 disposed on a first substrate 12. More specifically, the red, green, and blue sub-pixels R, G, and B can include the first pixel electrodes 14 and the first common electrodes 16 arranged alternately with each other on their regions. The viewing angle control sub-pixel S can include the second pixel electrode 18 disposed on its region. Each of the first pixel electrodes 14 and the first common electrodes 16 can be formed in a straight pattern or a bent pattern.

The upper substrate 20 can include color filters 24 and a second common electrode 25 disposed on a second substrate 22. More specifically, the color filters 24 can include red, green, and blue color filters disposed on the red, green, and blue sub-pixels R, G, and B. The second common electrode 26 can be disposed on the viewing angle control sub-pixel S. In addition, a black matrix not shown in the drawings can be disposed on the upper substrate 10 between the sub-pixels R, G, B, and S.

The first and second common electrodes 16 and 26 can receive a same common voltage or different common voltages. The first pixel electrodes 14 can receive a data voltage for displaying an image, while the second pixel electrode 18 can receive a viewing angle control voltage.

When any voltage is not applied to the first pixel electrodes 14 and the second pixel electrode 18, a black image can be displayed. This is because light is not transmitted.

Alternatively, if a voltage is not applied to the second pixel electrode 18 and data voltages for an image are applied to the first pixel electrodes 14, horizontal electric fields are induced in the red, green, and blue sub-pixels R, G, and B by the data voltages applied to the first pixel electrodes 14 and a common voltage applied to the first common electrodes 16. The liquid crystal layer 30 is driven by the horizontal electric fields, thereby transmitting light.

Figure 3A:
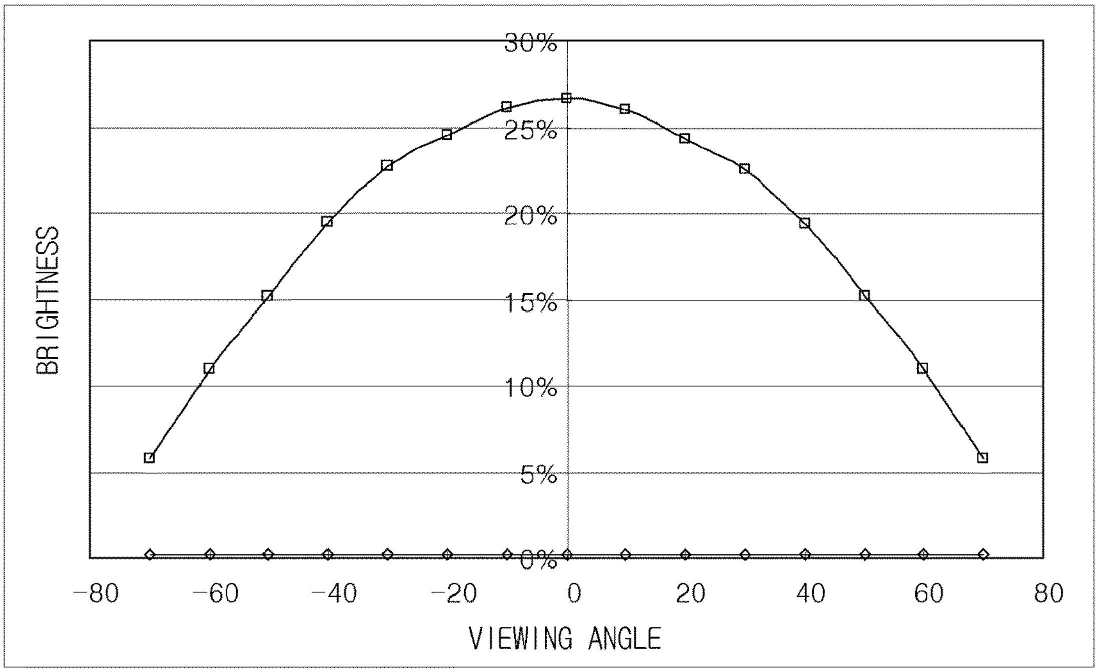
FIG. 3A is a graphic diagram explaining the brightness characteristic of R, G, and B pixels in FIG. 1.

In other words, when only the red, green, and blue sub-pixels R, G, and B without the viewing angle control sub-pixel S are driven, the liquid crystal panel provides maximum brightness at its front side (at a direction corresponding to about 0°), as shown in FIG. 3A, because it is affected by the viewing angle control sub-pixel S. As such, the main viewing angle of the liquid crystal panel becomes the front side where the image is mainly viewed. The front side of the liquid crystal panel may correspond to the eyes of a user.

In still another way, a viewing angle control voltage can be also applied to the second pixel electrode 18 in the viewing angle control sub-pixel S. The viewing angle control voltage on the second pixel electrode 18 together with a common voltage on the second common electrode 26 generates a vertical electric field which drives the liquid crystal layer 30. As such, light is transmitted through the viewing angle control sub-pixel.

Figure 3B:
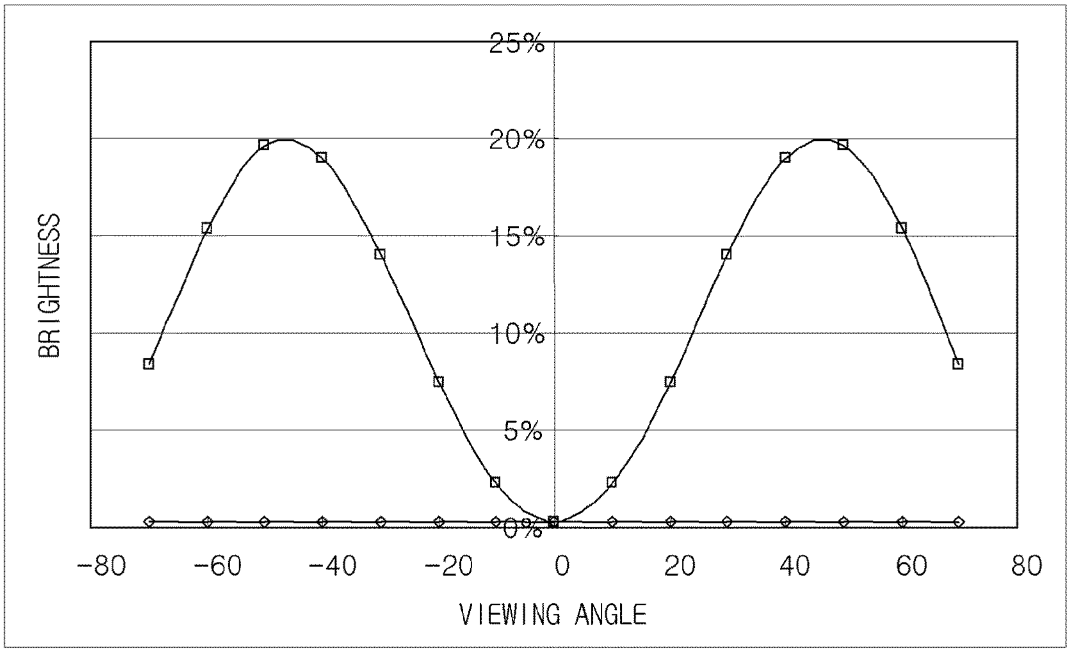
FIG. 3B is a graphic diagram explaining the brightness characteristic of a viewing angle control sub-pixel in FIG. 1.

The viewing angle control sub-pixel S has maximum brightness in the left and right side directions (at directions of about ±45°) rather than the front side direction of the liquid crystal panel, as shown in FIG. 3B. Therefore, when the viewing angle control sub-pixel S is driven, an image with maximum brightness in the front side direction of the liquid crystal panel is partially in interference with the brightness component of the viewing angle control sub-pixel S which has a maximum value in the left and right side directions of the liquid crystal panel. As a result, the image is not viewable from the left and right side directions.

Figure 4:
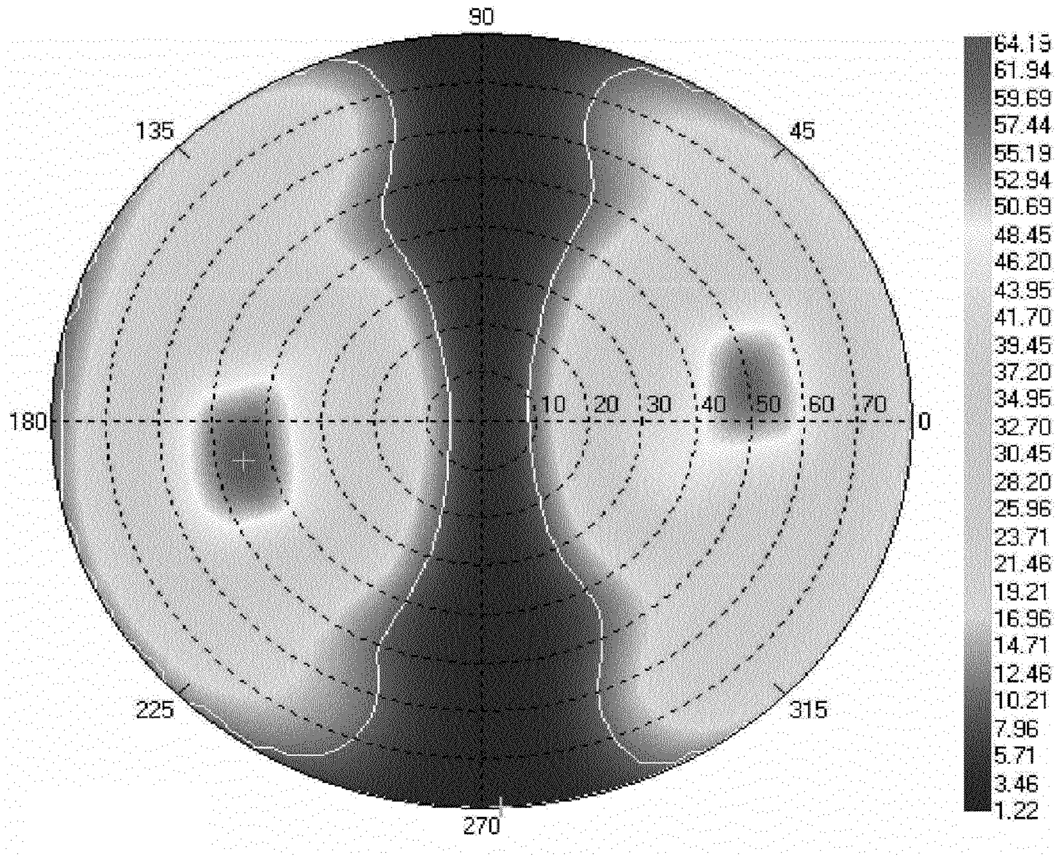
FIG. 4 is a data sheet explaining the simulated brightness characteristic of a viewing angle control sub-pixel in FIG. 1.

Actually, as shown in FIG. 4, brightness has a maximum value in the left and right direction of the liquid crystal panel rather than the front direction when the viewing angle control pixel S is driven. As such, an image viewed at the front side of the liquid crystal panel is not visible in the left and right directions of the liquid crystal panel due to interference. Nevertheless, the image displayed on the liquid crystal panel is still visible from upward diagonal directions.

On the contrary, an LCD device according to an embodiment of the present disclosure forces an image viewed from the front side direction of the liquid crystal panel not to be visible from the upward diagonal directions of the liquid crystal panel through interference. This will be explained in detail later.

Figure 5:
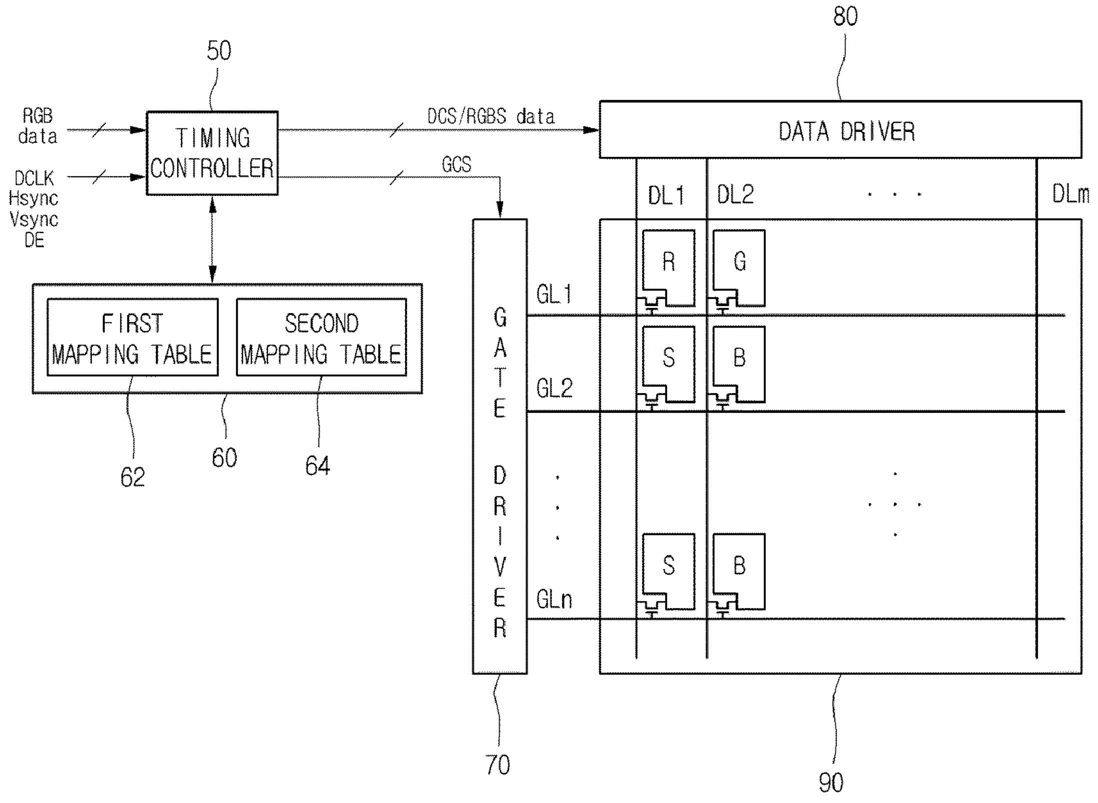
FIG. 5 is a block diagram showing an LCD device according to an embodiment of the present disclosure.
Figure 6:
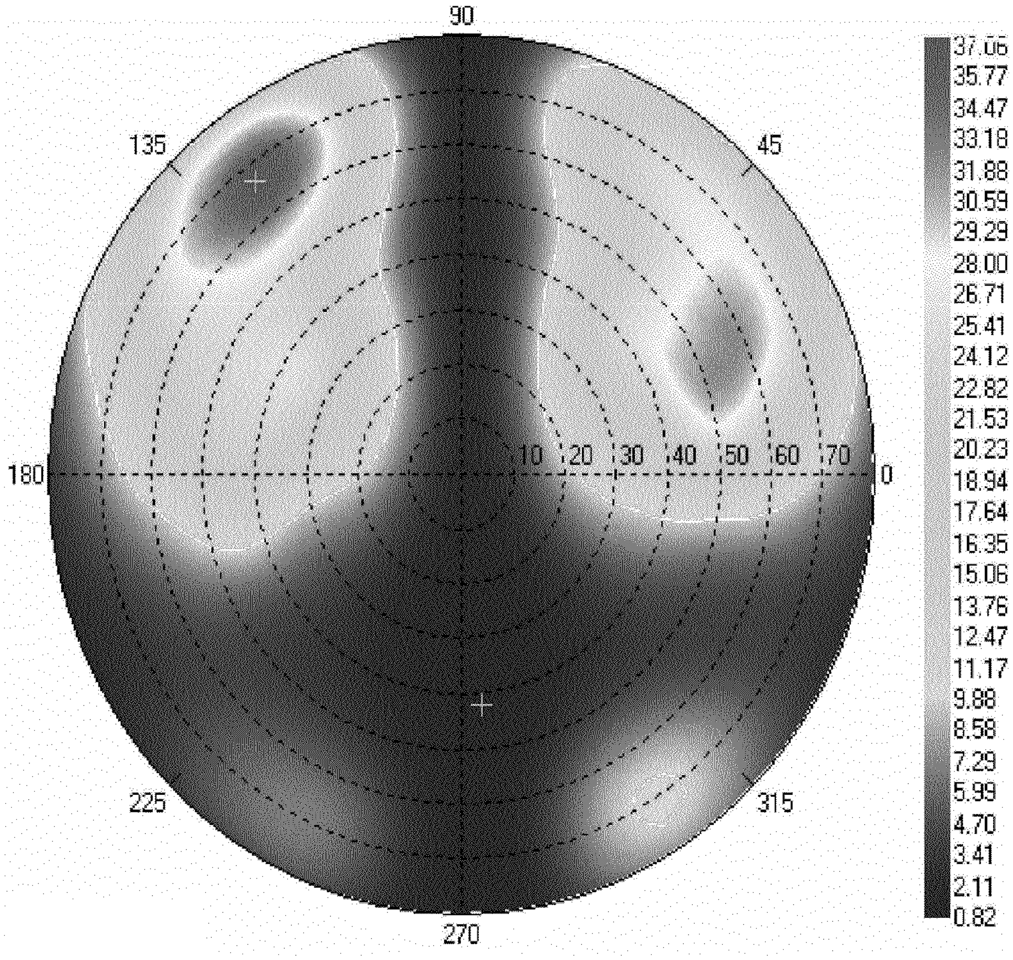
FIG. 6 is a data sheet explaining the simulated brightness characteristic of a viewing angle control sub-pixel to which an analog data voltage for a second narrow viewing angle mode is applied.

FIG. 5 is a block diagram showing an LCD device according to an embodiment of the present disclosure. Referring to FIG. 5, an LCD device according to an embodiment of the present disclosure includes a timing controller 50, a memory 60, a gate driver 70, a data driver 80, and a liquid crystal panel 90.

The liquid crystal panel 90 includes pixels of a quad type which each have adjacently arranged red, green, blue, and viewing angle control sub-pixels. The detailed explanation of the quad type pixel will be omitted as it is already explained above.

The timing controller 50 receives red, green, and blue data RGB-data from an exterior video source. The timing controller 50 further inputs synchronous signals including a dot clock DCLK, a vertical synchronous signal Vsync, a horizontal synchronous signal Hsync, and a data enable signal DE from the external video source.

The timing controller 50 derives gate control signals GCS and data control signals DCS from the synchronous signals DCLK, Vsync, Hsync, and DE. The gate control signals GCS include a gate start pulse, at least one gate shift clock, and gate output enable signal. The data control signals DCS include a source start pulse, a source shift clock, and a source output enable signal.

Also, the timing controller 50 rearranges the red, green, and blue data RGB-data in a format adapted to apply to the quad type pixels. For example, this data rearrangement allows the red data R-data and the green data G-data to be applied in response to activation of a first gate line GL1 and the blue data B-data to be applied in response to activation of second gate line GL2.

Moreover, the timing controller 50 responds to a viewing angle mode selected by a user. According to the selected viewing angle mode, the timing controller 50 enables viewing angle control data S-data to be selectively output.

The user can select any one of a wide viewing angle mode, a first narrow viewing angle mode, and a second narrow viewing angle mode. The wide viewing angle mode can become the viewing angle of the related art IPS mode LCD device. The first narrow viewing angle mode prevents an image from being viewed from the left and right directions of the user. The second viewing angle mode prevents an image from being viewed from the upward diagonal directions of the user.

More specifically, at the wide viewing angle mode, an image can be viewed in every direction (i.e., left, right, upper, and lower directions) in center of the user, as shown in FIG. 3A. On the other hand, since the first narrow viewing angle mode enables the viewing angle control sub-pixel S to have maximum brightness from the left and right directions of the user, as shown in FIGS. 3A and 4, an image viewed from the front side direction of the liquid crystal panel 90 is not viewable from the left and right directions of the user. Similarly, the second narrow viewing angle mode forces the viewing angle control sub-pixel S to have maximum brightness from the upward diagonal directions of the user, so that an image viewed from the front side direction of the liquid crystal panel 90 is not visible from the upward diagonal directions of the user.

The memory 60 includes a first mapping table 62 for the first narrow viewing angle mode, and a second mapping table 64 for the second narrow viewing angle mode. The first and second mapping tables 62 and 64 can become look-up tables each including a plurality of narrow viewing angle control data which each corresponds to an added value or a multiplied value of the red, green, and blue data. Alternatively, the plurality of narrow viewing angle control data can be provided by a variety of ways.

In other words, the first mapping table 62 for the first narrow viewing angle mode can be a look-up table including a plurality of first viewing angle control data which each correspond to the added value or the multiplied value of the red, green, and blue data RGB-data. Similarly, the second mapping table 64 can be another look-up table including a plurality of second narrow viewing angle control data which each correspond to the added value or the multiplied value of the red, green, and blue data RGB-data. The second narrow viewing angle control data can have a higher value of about 10%~100% than the first narrow viewing angle control data. For example, if the first narrow viewing angle control data has a gray level of 50, the second narrow viewing angle control data can become any one among gray levels of 55~100.

Therefore, the timing controller 50 responding to a viewing angle mode designated by the user applies the viewing angle control data S together with the rearranged red, green, and blue data RGB-data to the data driver 80. Actually, the timing controller 50 can output a gray level of "0" as a wide viewing angle control data when the user selects the wide viewing angle mode. When the user selects the first narrow viewing angle mode, the timing controller 50 can read and output the first narrow viewing angle control data, which is stored in the first mapping table 62 within the memory 60 and corresponds to the added value or the multiplied value of the red, green, and blue data RGB-data. Furthermore, if the user selects the second narrow viewing angle mode, the timing controller 50 can read and output the second narrow viewing angle control data, which is stored in the second mapping table 64 within the memory 60 and corresponds to the added value or the multiplied value of the red, green, and blue data RGB-data.

The gate driver 70 replies to the gate control signals GCS applied from the timing controller 50 and supplies gate signals to respective gate lines GL1~GLn on the liquid crystal panel 90. The gate signals enable thin film transistors connected to the gate lines GL1~GLn to be sequentially turned-on (or activated) line by line.

The data driver 80 responding to the data control signals DCS applied from the timing controller 50 converts the red, green, and blue data RGB-data and the viewing angle control data S-data into analog voltages and supplies the converted voltages to respective data lines DL1~DLm on the liquid crystal panel 90. The red data R-data can be converted into a red analog data voltage, the green data G-data can be converted into a green analog data voltage, and the blue data B-data can be converted into a blue analog data voltage. Similarly, the viewing angle control data S-data can be converted into a viewing angle control analog-data-voltage.

As such, the red analog data voltage is applied to the red sub-pixel R, the green analog data voltage is applied to the green sub-pixel G, and the blue analog data voltage is applied to the blue sub-pixel B. Also, the viewing angle control analog-data-voltage is applied to the viewing angle control sub-pixel S.

The viewing angle control analog-data-voltage can include any one among an analog data voltage of "0", a first narrow viewing angle control analog-data-voltage, and a second narrow viewing angle control analog-data-voltage. The second narrow viewing angle control analog-data-voltage can have a higher level of about 10%~100% than the first narrow viewing angle control analog-data-voltage. To rectify this, the second narrow viewing angle control analog-data-voltage becomes higher (or larger) than the first narrow viewing angle control analog-data-voltage. Such a narrow viewing angle control analog-data-voltage applied to the viewing angle control sub-pixel S enables the displacement of liquid crystal molecules to become lager, so that brightness of the viewing angle control sub-pixel S has a maximum value in its upward diagonal directions.

When the analog data voltage of "0V" is applied to the viewing angle control sub-pixel S (i.e., during the wide viewing angle mode), the viewing angle control sub-pixel S is not driven and an image displayed on the liquid crystal panel 90 is not affected by the viewing angle control sub-pixel S. At this time, the image can be viewed from every direction.

Also, if the first narrow viewing angle control analog-data-voltage is applied to the viewing angle control sub-pixel S (i.e., during the first narrow viewing angle mode), brightness of the viewing angle control sub-pixel has a maximum value in its left and right side directions, as shown in FIGS. 3A and 4, and prevents an image from being viewed in the left and right side directions of the viewing angle control sub-pixel S. Accordingly, the image displayed on the liquid crystal panel 90 cannot be viewed from the left and right side directions of a user.

Similarly, when the second viewing angle control analog-data-voltage is applied to the viewing angle control sub-pixel S (i.e., during the second viewing angle mode), brightness of the viewing angle control sub-pixel S becomes a maximum value in its upward diagonal directions and prevents an image from being viewed from the upward diagonal directions of the viewing angle control sub-pixel S. In this case, the image displayed on the liquid crystal panel 90 cannot be viewed in the upward diagonal directions of a user.

As described above, the LCD device according to an embodiment of the present disclosure controls a range of viewing angles, thereby allowing the image to be viewed from every direction or not to be viewed from the left and right directions or the upward diagonal directions in the center of the user. In other words, the LCD device can limit the image display according to the positions of the persons adjacent to the user. Therefore, the user using the LCD device can adjust it to freely share information or to limit its range with adjacent persons. Furthermore, the LCD device can enhance information reliability and security.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device comprising:

a liquid crystal panel including a plurality of quad type pixels each having red, green, blue, and viewing angle control sub-pixels; and a timing controller, responsive to a viewing angle mode selected by a user, applying red, green, and blue data and any one of a wide viewing angle control data, a first narrow viewing angle control data, and a second narrow viewing angle control data to the liquid crystal panel.

2. The liquid crystal display device claimed as claim 1, further comprising:

a data driver converting the red, green, and blue data and any one of the wide viewing angle control data, the first narrow viewing angle control data, and the second narrow viewing angle control data into analog data voltages; and a gate driver activating the sub-pixels on the liquid crystal panel.

3. The liquid crystal display device claimed as claim 2, wherein the wide viewing angle control analog-data-voltage converted from the wide viewing angle control data is a voltage of “0”.

4. The liquid crystal display device claimed as claim 2, wherein the second narrow viewing angle control analog data voltage converted from the second narrow viewing angle control data has a higher voltage of about 10%~100% of the first narrow viewing angle control analog data voltage converted from the first narrow viewing angle control data.

5. The liquid crystal display device claimed as claim 2, wherein the viewing angle control sub-pixel replies to the first narrow viewing angle control analog data voltage and prevents an image from being viewed from left and right side directions of a user positioned in front of the liquid crystal panel.

6. The liquid crystal display device claimed as claim 2, wherein the viewing angle control sub-pixel replies to the second narrow viewing angle control analog data voltage and prevents an image from being viewed from upward diagonal directions of a user which is positioned in front of the liquid crystal panel.

7. The liquid crystal display device claimed as claim 1, further comprising a memory is mapped with the first narrow viewing angle control data and the second narrow viewing angle control data.

8. The liquid crystal display device claimed as claim 7, wherein the first and second narrow viewing angle control data each correspond to any one of an added value and a multiplied value of the red, green, and blue data.

9. The liquid crystal display device claimed as claim 1, wherein the red, green, and blue sub-pixels drive a liquid crystal by a horizontal electric field and the viewing angle control sub-pixel drives the liquid crystal by a vertical electric field.

10. The liquid crystal display device claimed as claim 1, wherein the red and green sub-pixels are connected to one of two adjacent gate lines of the liquid crystal panel, and the blue and viewing angle control sub-pixels are connected to the other adjacent gate line.

11. The liquid crystal display device claimed as claim 10, wherein the red and viewing angle control sub-pixels are connected to one of two adjacent data lines of the liquid crystal panel, and the green and blue sub-pixels are connected to the other adjacent data line.

* * * * *